（12）United States Patent
Gaubatz et al.

(10) Patent No.: US 10,977,466 B2
(45) Date of Patent: Apr. 13, 2021

(54) MULTI-DIMENSIONAL CYCLIC SYMBOLS (71) Applicant: Hewlett-Packard Development Company, L.P., Houston, TX (US)

(72) Inventors: Matthew D Gaubatz, Seattle, WA (US); Steven J Simske, Palo Alto, CA (US); Robert Ulichney, Stow, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 271 days.

(21) Appl. No.: 15/569,766

(22) PCT Filed: Jul. 9, 2015

(86) PCT No.: PCT/US2015/039694
§ 371 (c)(1),
(2) Date: Oct. 27, 2017

(87) PCT Pub. No.: WO2017/007483
PCT Pub. Date: Jan. 12, 2017

(65) Prior Publication Data
US 2018/0137320 A1    May 17, 2018

(51) Int. Cl.
*G06K 7/14* (2006.01)
*G06K 19/06* (2006.01)
*G06T 11/40* (2006.01)

(52) U.S. Cl.
CPC .......... *G06K 7/1417* (2013.01); *G06K 7/143* (2013.01); *G06K 7/1413* (2013.01);
(Continued)

(58) Field of Classification Search
CPC .... G06K 7/1417; G06K 7/1413; G06K 7/143; G06K 19/06028; G06K 19/06037; G06K 19/06093
See application file for complete search history.

(56) References Cited

U.S. PATENT DOCUMENTS 4,453,249 A * 6/1984 Roth ..................... H04L 1/0041
714/775
4,847,842 A * 7/1989 Schilling ............... H03M 13/29
714/755

(Continued)

FOREIGN PATENT DOCUMENTS

CN        102194137        9/2011
CN        103701526        4/2014

OTHER PUBLICATIONS

European Search Opinion, EP 15897875, dated Nov. 30, 2018. (Year: 2018).*

(Continued)

*Primary Examiner* — Daniel I Walsh
(74) *Attorney, Agent, or Firm* — HP Inc. Patent Department (57) ABSTRACT

An example system to represent data with multi-dimensional cyclic symbols is provided. The system includes a representation engine, a symbol engine, and a translation engine. The representation engine is to provide a plurality of display symbols. Display symbols are selected from a set of multi-dimensional cyclic symbols. The symbol engine is to receive a plurality of received symbols. The translation engine is to convert the plurality of received symbols into a plurality of display symbols.

17 Claims, 7 Drawing Sheets

(52) U.S. Cl.
CPC . *G06K 19/06028* (2013.01); *G06K 19/06037* (2013.01); *G06K 19/06093* (2013.01); *G06T 11/40* (2013.01)

(56) References Cited

U.S. PATENT DOCUMENTS

| | | | | |
|---|---|---|---|---|
| 5,136,592 A * | 8/1992 | Weng | ............... | G11B 20/1833 708/492 |
| 5,168,147 A * | 12/1992 | Bloomberg | .......... | G06K 7/0166 235/456 |
| 5,221,833 A * | 6/1993 | Hecht | .................. | G06K 7/143 235/487 |
| 5,395,181 A * | 3/1995 | Dezse | ................... | B41J 3/01 235/432 |
| 5,428,719 A * | 6/1995 | Sato | ..................... | G06T 11/40 345/420 |
| 5,453,605 A * | 9/1995 | Hecht | .................. | G06K 7/143 235/456 |
| 5,548,110 A * | 8/1996 | Storch | ................... | G06F 11/14 235/462.07 |
| 5,576,532 A * | 11/1996 | Hecht | .................. | G06K 7/143 235/456 |
| 5,727,194 A * | 3/1998 | Shridhar | ............... | G06F 8/447 712/241 |
| 5,862,271 A * | 1/1999 | Petrie | ................... | G06K 7/0166 235/494 |
| 5,946,103 A * | 8/1999 | Curry | ................... | G06T 1/0028 235/494 |
| 5,987,631 A * | 11/1999 | Kong | ..................... | H03M 13/41 714/704 |
| 6,062,481 A * | 5/2000 | Storch | ................... | G06F 11/14 235/494 |
| 6,141,441 A | 10/2000 | Cass et al. | | |
| 6,182,901 B1 * | 2/2001 | Hecht | ..................... | G06K 7/14 235/487 |
| 7,284,129 B2 * | 10/2007 | Pelly | ..................... | G06T 1/0071 380/201 |
| 8,430,328 B2 * | 4/2013 | Yoshida | ............. | G06F 3/03545 235/494 |
| 9,087,591 B1 * | 7/2015 | Huang | ................. | G11C 16/349 |
| 10,044,369 B1 * | 8/2018 | Paris | .................. | H03M 7/3084 |
| 10,621,688 B2 * | 4/2020 | Simske | ............ | G06K 19/06018 |
| 10,721,029 B2 * | 7/2020 | Xu | ......................... | H04L 1/1819 |
| 10,891,704 B2 * | 1/2021 | Simske | ............ | G06K 19/06037 |
| 2001/0035971 A1 | 11/2001 | Koakutsu et al. | | |
| 2002/0001415 A1 * | 1/2002 | Latva-Aho | ............ | H04N 19/60 382/251 |
| 2002/0116677 A1 * | 8/2002 | Morelos-Zaragoza | ...................... | H03M 13/1191 714/781 |
| 2002/0196979 A1 * | 12/2002 | Yen | ........................ | G06K 7/14 382/190 |
| 2003/0047612 A1 | 3/2003 | Shaked et al. | | |
| 2003/0197878 A1 | 10/2003 | Metois et al. | | |
| 2004/0075851 A1 * | 4/2004 | Hecht | .................... | G06K 9/036 358/1.9 |
| 2004/0148558 A1 * | 7/2004 | Lapstun | ................ | G06F 3/0317 714/781 |
| 2004/0256471 A1 * | 12/2004 | Lapstun | ................ | G06K 7/1473 235/494 |
| 2004/0264599 A1 | 12/2004 | Lliev | | |
| 2005/0138516 A1 * | 6/2005 | Yedidia | ................ | H03M 13/114 714/746 |
| 2005/0285761 A1 * | 12/2005 | Jancke | ............. | G06K 19/06037 341/50 |
| 2006/0045273 A1 * | 3/2006 | Mayer | ....................... | H04L 9/12 380/277 |
| 2006/0050427 A1 * | 3/2006 | Mohan | ................ | G11B 20/1411 360/39 |
| 2006/0067531 A1 * | 3/2006 | Yamazaki | ............ | H04L 9/3236 380/239 |
| 2007/0273709 A1 * | 11/2007 | Kimura | .................. | H04N 19/89 345/619 |
| 2009/0070653 A1 * | 3/2009 | Kim | ..................... | H04L 1/0065 714/758 |
| 2009/0077449 A1 * | 3/2009 | Lee | ...................... | H03M 13/611 714/785 |
| 2009/0078767 A1 * | 3/2009 | Lapstun | ................ | G06F 3/1206 235/454 |
| 2010/0005368 A1 * | 1/2010 | Lee | ...................... | H03M 13/15 714/768 |
| 2010/0205510 A1 * | 8/2010 | von der Embse | ...... | H04L 27/34 714/776 |
| 2011/0115655 A1 * | 5/2011 | Noda | .................. | G11B 20/1833 341/59 |
| 2011/0180602 A1 * | 7/2011 | Napper | .................... | G06K 7/14 235/454 |
| 2011/0191650 A1 * | 8/2011 | Yokokawa | ......... | H03M 13/1137 714/752 |
| 2011/0320917 A1 * | 12/2011 | Lapstun | ................ | G06F 3/0317 714/781 |
| 2012/0300828 A1 * | 11/2012 | Erez | ..................... | H04L 1/0059 375/230 |
| 2013/0068841 A1 | 3/2013 | Santosa et al. | | |
| 2014/0119615 A1 * | 5/2014 | Mercolino | ............. | G07D 7/004 382/112 |
| 2014/0263642 A1 | 9/2014 | Mesh et al. | | |
| 2017/0222752 A1 * | 8/2017 | Hamada | ............ | H03M 13/1575 |
| 2018/0005342 A1 * | 1/2018 | Simske | ............ | G06K 19/06018 |
| 2018/0137320 A1 * | 5/2018 | Gaubatz | ................ | G06K 7/1413 |
| 2019/0108093 A1 * | 4/2019 | Presman | ................ | G11C 29/52 |

OTHER PUBLICATIONS

Ulichney R et al, "Circular Coding for Data Embedding", 2013.
R Ulichney et al., "Circular Coding with Interleaving Phase", Sep. 19, 2014, DocEng 14 Proceedings of the 2014 ACM symposium on Documents engineering pp. 1-3; Fig 1-4.

* cited by examiner

MULTI-DIMENSIONAL CYCLIC SYMBOLS

BACKGROUND

Circular coding embeds information by repeating the symbols in the code in a structured, defined and consistent way across the entire targeted surface. As with the methods designed for binary symbols, circular coding allows a complete payload to be recovered by capturing only a portion of a larger encoded surface.

DETAILED DESCRIPTION

Information may be encoded in a pattern on a surface. The pattern may comprise symbols from a set of M-ary cyclic symbols. M-ary cyclic symbols are a set of M values selected to represent a cyclic symbol space. A cyclic symbols space is one where values in the space increase monotonically until a limit is reached, at which point the values in the space return to the smallest value in the space. M-ary cyclic symbols are ordered and the arrangement of each M-ary symbol is denoted by an index in the range [0, (M-1)], where the symbol with the maximum index (M-1) is followed by the zero index symbol.

"Cyclic coding" is a system of representing data using symbols in a domain that wraps around on itself. One example is colors positioned at different locations in hue space. The domain of hue space is similar to that of trigonometric functions, i.e., there is an "angle" associated with different measurements, and it is (2*pi)-periodic. Multi-dimensional cyclic coding concerns a group of techniques for representing information with symbols exhibiting multiple cyclic dimensions. Multi-dimensional cyclic symbol spaces are convenient because they enable the application of elegant and efficient mathematical models to distinguish between different symbols or collections of symbols in this type of space. One-dimensional M-ary symbols can be used for circular coding schemes, a mechanism by which data can be repeated across space in a compact manner. Multi-dimensional cyclic symbol sets enable multiple simultaneous periodicities to exist along the different cyclic dimensions, which can be used to increase the functionality of error-correcting schemes.

Examples of systems to represent data with multi-dimensional cyclic symbols are provided herein. The system includes a representation engine, a symbol engine, and a translation engine. The representation engine is to provide a plurality of display symbols selected from a set of multi-dimensional cyclic symbols. The symbol engine is to receive a plurality of received symbols. The translation engine is to convert the plurality of received symbols into a plurality of display symbols. Multi-dimensional cyclic symbol spaces have convenient properties when measuring or optimizing performance with respect to data density, coding efficiency, and end-to-end robustness. Incorporation of additional cyclic dimensions helps disambiguate symbols in a cyclic symbol partitioning scheme. The additional cyclic dimensions also enable optimization of efficient encoding and decoding procedures with shorter messages.

Figure 1:
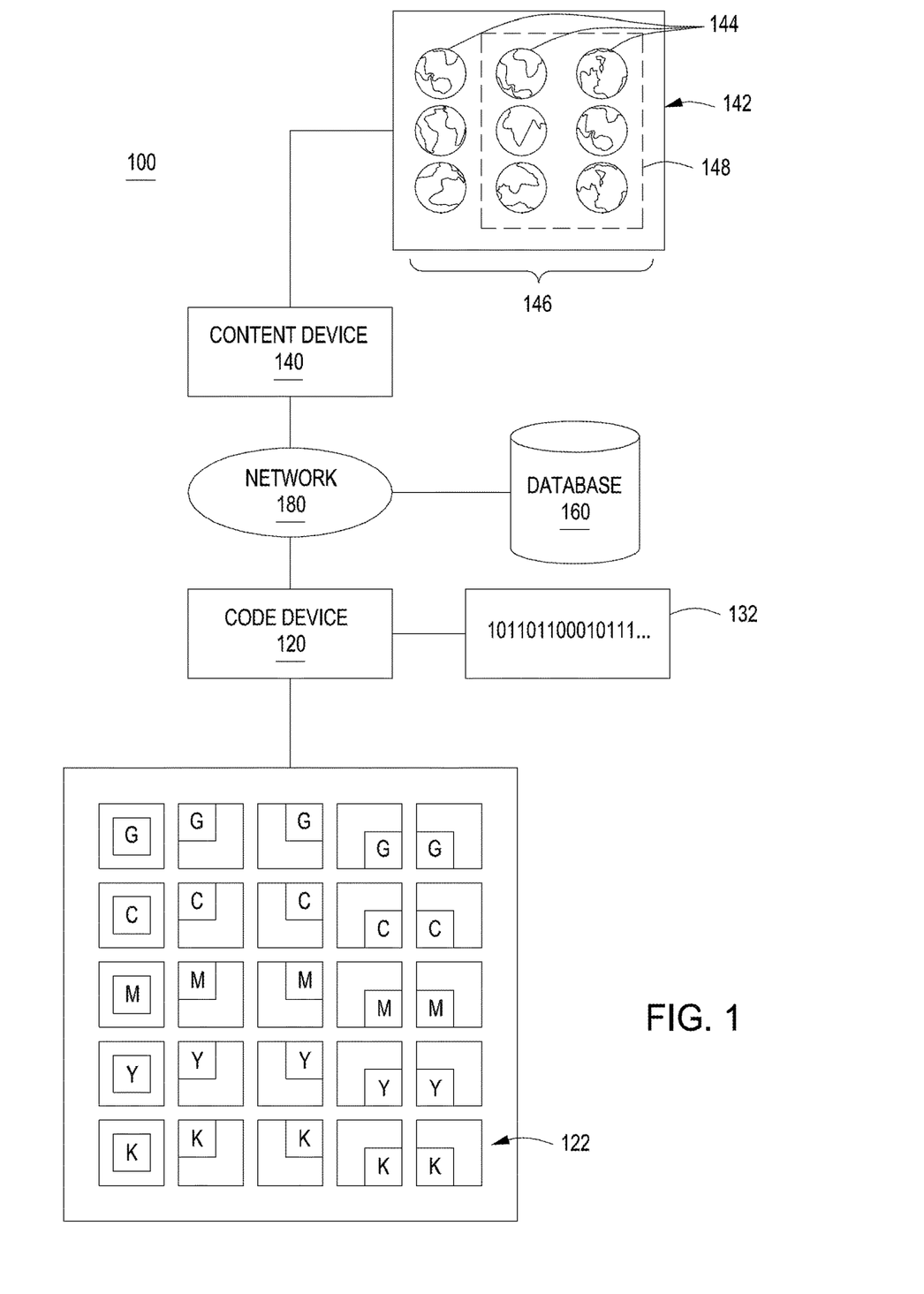
FIG. 1 illustrates an overview of a system to represent data with multi-dimensional cyclic symbols according to an example.

FIG. 1 illustrates an overview of a system to represent data with multi-dimensional cyclic symbols according to an example. System 100 may be implemented in a number of different configurations without departing from the scope of the disclosed examples. In FIG. 1, system 100 may include a code device 120, a content device 140, a database 160, and a network 180 for connecting code device 120 with database 160 and/or content device 140.

Code device 120 may be a computing system that performs various functions consistent with disclosed examples, such as providing a representation of data with multi-dimensional cyclic symbols. Multi-dimensional cyclic symbols within a symbol set may be structured, defined and consistent. Examples of code device 120 include a desktop computer, a laptop computer, a tablet computing device, a mobile phone, a server, and/or any other type of computing device. Code device 120 may provide a plurality of display symbols selected from a set of multi-dimensional cyclic symbols. For example, display symbols may include symbols with a base greater than two. These symbols may include any two or more features selected from, for example, colors, numbers, letters, glyphs, sizes, positions, and angles. For example, multi-dimensional cyclic symbols may include a plurality of symbols each defined by differences between another set of multi-dimensional cyclic symbols. The plurality of display symbols may be stored in database 160. A set of display symbols 122 with various colors and positions are illustrated as defined and provided by the code device 120. For illustrative purposes, each square is positioned within the cell at one of the five positions and each square is designed a color green, G, Cyan, C, Magenta, M, Yellow, Y, or Black, K. The set of display symbols 122 may then be used to encode information.

Code device 120 may also receive a plurality of received symbols. For example, the received symbols 132 may be binary codes. The plurality of received symbols 132 may be stored in database 160. Code device 120 may convert the plurality of received symbols 132 into a plurality of display symbols 122. The converted symbols may then be presented to a user via a target surface 142, such as a printed media or an electronic media such as a display screen using the content device 140. Examples of code device 120 and certain functions that may be performed by code device 120 are described in greater detail below with respect to, for example, FIGS. 2-4.

Content device 140 may be any device that maintains, receives, or transfers content data from a content data collection. For example, content device 140 may be a scanning device, a printing device, or a computing device, such as a desktop computer, a laptop computer, a table computing device, a mobile phone, a server, or any other type of computing device. Content device 140 may receive, transfer, or otherwise access content data collections, such as articles and controlled data sets, used to collect data for the code device 120. For example, content device 140 may receive display symbols 122 from code device 120. Content device 140 may then print the display symbols 122 on a target surface, such as a print media or electronic media, i.e., a display device. For example, content device 140 may include a processor, and may access, via the processor, a digital version of the display symbols 122. The digital version may include an image to be displayed on content device 140 or a digital version to be printed on a print media such as a package via content device 140.

The set of display symbols 122 may be arranged on the target area, or other sets of display symbols 122 may be used. For illustrative purpose, another example of display symbols 122 are shown. The set of display symbols 122 may be images of globes 144 shown in three-dimensional rotation and printed on a target surface 142. Each of the globes 144 may be in an in-plane position, an out-of-plane longitude position, or an out-of-plane latitude position. Nine globes 144 are shown in an encoded pattern 146 for illustrative purposes and a capture area 148 containing six globes 144 is also illustrated. The globes 144 within the capture area 148 may be used to decode the information or data converted or translated from the received symbols 132. Each globe 144 is a display symbol 122 with a value associated therewith. The value may be linked to information or data or it may be designated as a start point for the code. Examples of display symbols 122 are discussed in greater detail below with respect to, for example, FIGS. 5-8.

Database 160 may be any type of storage system configuration that facilitates the storage of data. For example, database 160 may facilitate the locating, accessing, and retrieving of data (e.g., SaaS, SQL, Access, etc. databases, XML files, etc.). Database 160 can be populated by a number of methods. For example, code device 120 may populate database 160 with database entries generated by code device 120, and store the database entries in database 160. As another example, code device 120 may populate database 160 by receiving a set of database entries from another component, a wireless network operator, and/or a user of content device 140, and storing the database entries in database 160. In yet another example, content device 140 may populate database 160 by, for example, obtaining data from a content device 140, such as through use of a scanner or scanning device connected to content device 140. The database entries can contain a plurality of fields, which may include information related to display symbols 122 and received symbols 132, such as user preferences, encoding data, and decoding data. While in the example shown in FIG. 1 database 160 is a single component external to components 120 and 140, database 160 may comprise separate databases and/or may be part of devices 120, 140, and/or another device. In some implementations, database 160 may be managed by components of devices 120 and/or 140 that are capable of accessing, creating, controlling and/or otherwise managing data remotely through network 180.

Network 180 may be any type of network that facilitates communication between remote components, such as code device 120 and content device 140. For example, network 180 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1, shows one code device 120, content device 140, database 160, and network 180, system 100 may include any number of components 120, 140, 160, and 180, as well as other components not depicted in FIG. 1. System 100 may also omit any of components 120, 140, 160, and 180. For example, code device 120 and content device 140 may be directly connected instead of being connected via network 180. As another example, code device 120 and content device 140 may combined to be a single device.

Figure 2:
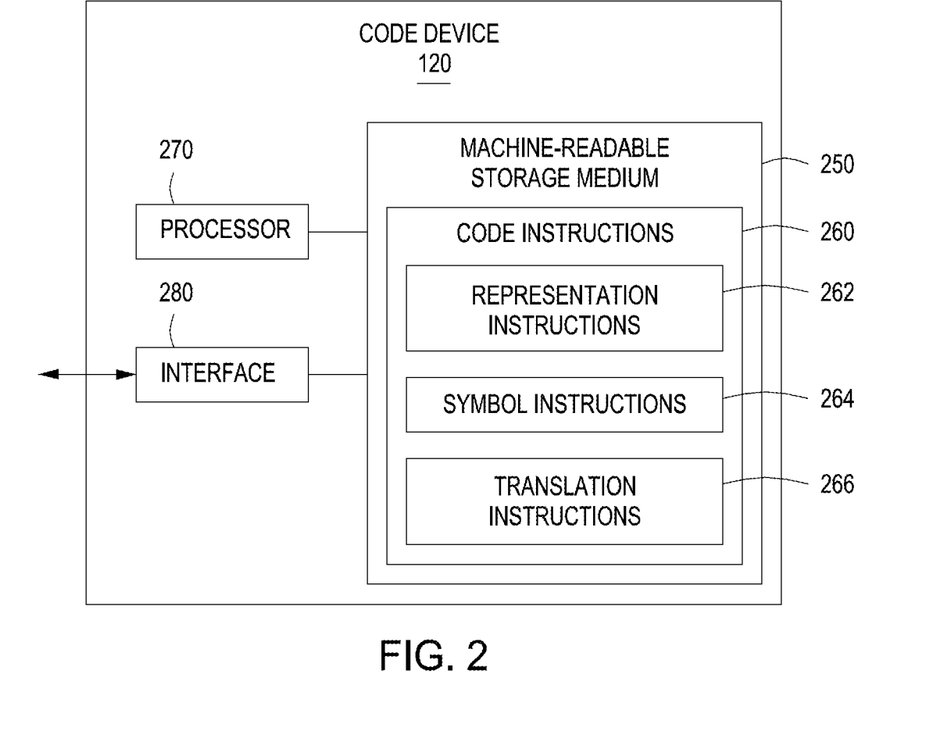
FIGS. 2-3 illustrate code devices to represent data with multi-dimensional cyclic symbols according to examples.
Figure 3:
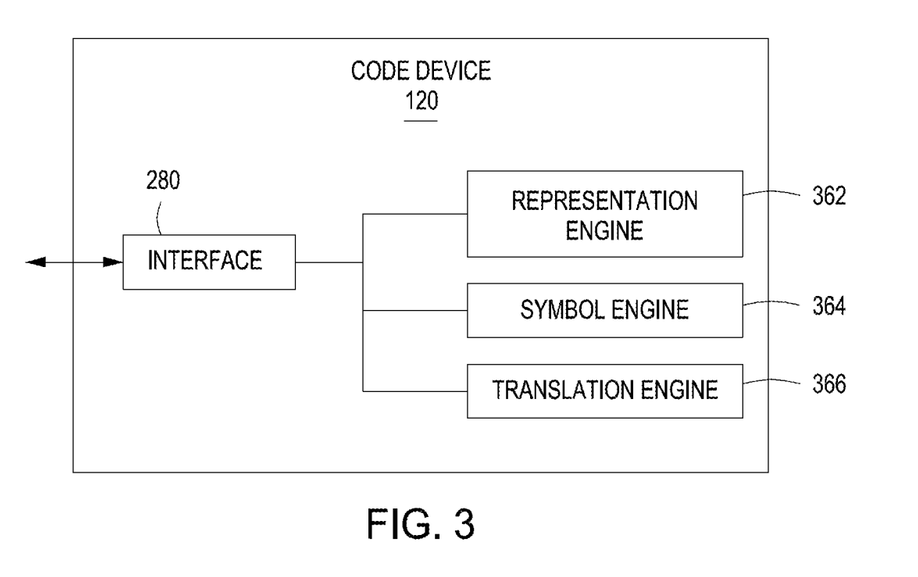

FIGS. 2-3 illustrate code devices to represent data with multi-dimensional cyclic symbols according to examples. Referring to FIG. 2, a code device 120 is illustrated. In certain aspects, code device 120 may correspond to multiple code devices 120 of FIG. 1. Code device 120 may be implemented in various ways. For example, code device 120 may be a special purpose computer, a server, a mainframe computer, a computing device executing instructions that receive and process information and provide responses, and/or any other type of computing device. In the example shown in FIG. 2, code device 120 may include a machine-readable storage medium 250, a processor 270, and an interface 280.

Processor 270 may be at least one processing unit (CPU), microprocessor, and/or another hardware device to execute instructions to perform operations. For example, processor 270 may fetch, decode, and execute code instructions 260 (e.g., instructions 262, 264, and/or 266) stored in machine-readable storage medium 250 to perform operations related to examples provided herein.

Interface 280 may be any device that facilitates the transfer of information between code device 120 and other components, such as content device 140 and/or database 160. In some examples, interface 280 may include a network interface device that allows code device 120 to receive and send data to and from network 180. For example, interface 280 may retrieve and process data related to providing a representation of data with multi-dimensional cyclic symbols from database 160 via network 180.

Machine-readable storage medium 250 may be any electronic, magnetic, optical, or other physical storage device that stores executable instructions. Thus, machine-readable storage medium 250 may be, for example, memory, a storage drive, an optical disc, and/or the like. In some implementations, machine-readable storage medium 250 may be non-transitory, such as a non-transitory computer-readable storage medium, where the term "non-transitory" does not encompass transitory propagating signals. Machine-readable storage medium 250 may be encoded with instructions that, when executed by processor 270, perform operations consistent with the examples herein. For example, machine-readable storage medium 250 may include instructions that perform operations that provide a representation of data with multi-dimensional cyclic symbols. In the example shown in FIG. 2, the machine-readable storage medium 250 may be a memory resource that stores instructions that when executed cause a processing resource, such as processor 270 to implement a system to represent data with multi-dimensional cyclic symbols. The instructions include code instructions 260, such as representation instructions 262, symbol instructions 264, and translation instructions 266.

Representation instructions 262 may function to provide a plurality of display symbols selected from a set of multi-dimensional cyclic symbols. For example, when representation instructions 262 are executed by processor 270, representation instructions 262 may cause processor 270 of code device 120, and/or another processor to arrange the set of multi-dimensional cyclic symbols cyclically with a differential phase between any two symbol values. A property of M-ary symbols is that the M symbols can be arranged cyclically. Each symbol is arranged in order of value and the symbol with the maximum index (M-1) is followed by the zero index symbol. The differential phase between symbols may be used as another source of symbols. For example, in a quinary (5-ary) system, any two symbol values may be described by a differential phase between them, such that, the phase between the fourth symbol value and the first symbol value is two out of five (2/5) periods.

The execution of the representation instructions 262 may also cause processor 270 of code device 120, and/or another processor to vary at least two features of the plurality of display symbols. Two features may be two sets of feature values selected from a set of values, a set of colors, a set of sizes, a set of positions, a set of angles, and a set of glyphs. Two features, in accordance with an example, may include rotation of the symbol set and changing the color of the symbol set to form multi-dimensional cyclic symbols.

Generation of a multi-dimensional set of symbols may be formed with a collection of symbols having multiple cyclic features that are varied across the symbol feature spaces. The multi-dimensional cyclic symbols may be represented as an N-tuple of different feature values, i.e., symbol_value= (feature_1_value, feature_2_value, . . . , feature_N_value). In other words, each display symbol may be expressed with a corresponding N-tuple.

Figure 7:
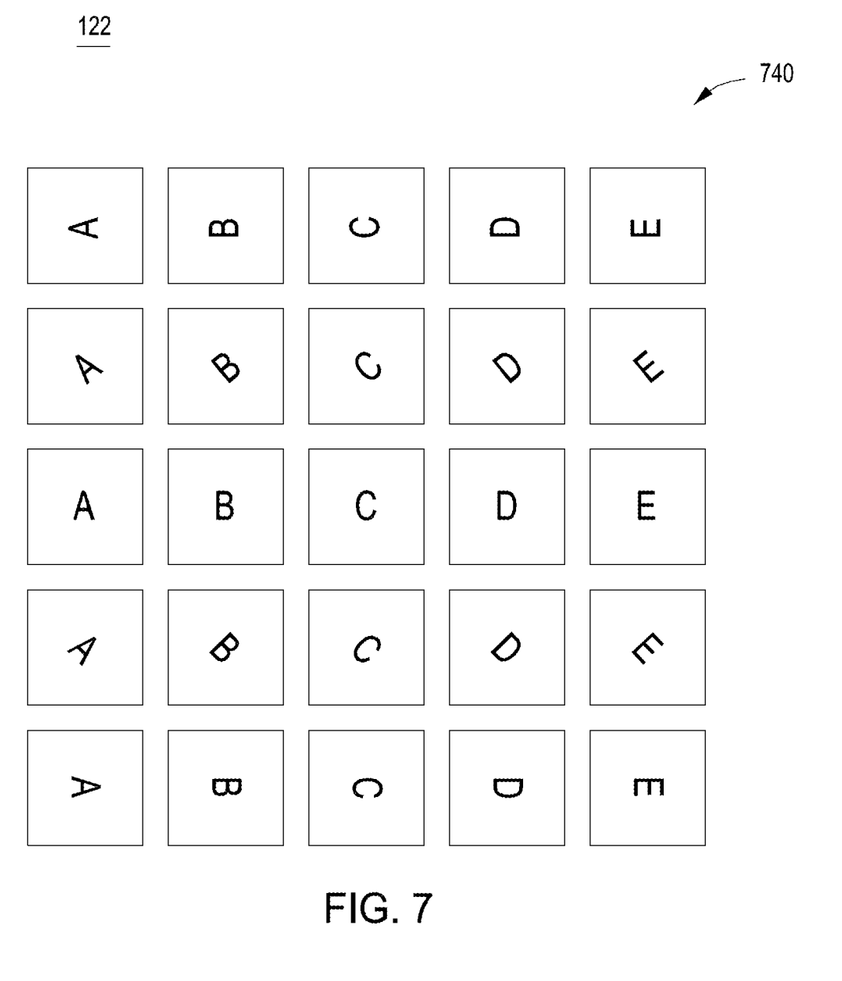
FIG. 7-8 illustrate multi-dimensional cyclic symbols and an arrangement of symbols according to an example.
Figure 8:
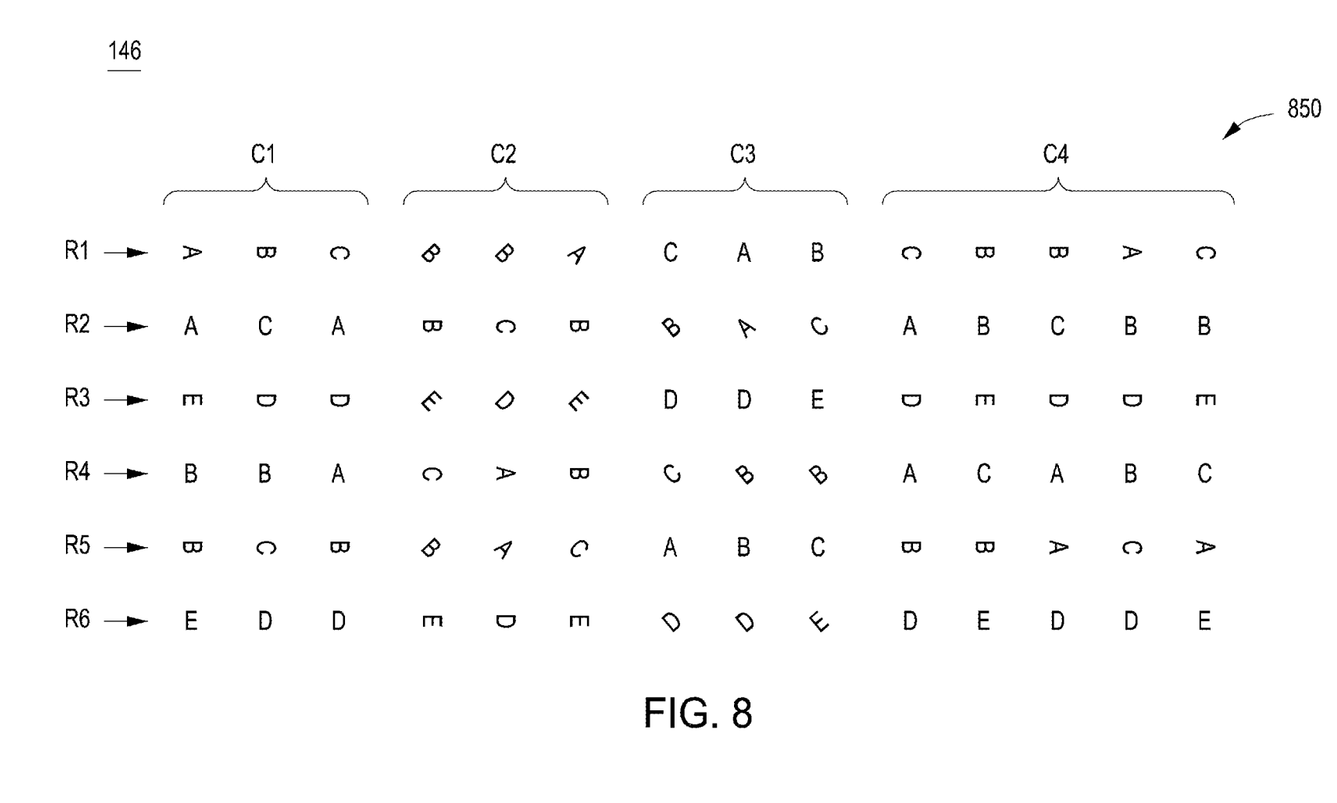

The first varied feature may be color. The second varied feature may be position. Both values expressed in this form, i.e., symbol_value=(color value, shape value) are illustrated in FIG. 5. In a further example, the first varied feature maybe a letter or glyph. The second varied feature may be orientation. Groups of symbols with these collections of features are illustrated in FIGS. 7-8. Examples of the steps involved in the defining the multi-dimensional cyclic symbols and example symbols are described in further detail below with respect to, for example, FIGS. 4-8.

Symbol instructions 264 may function to receive a plurality of received symbols. For example, when symbol instructions 264 are executed by processor 270, symbol instructions 264 may cause processor 270 of code device 120, and/or another processor to obtain received symbols, such as a binary representation of a code. The symbol instructions 264 may also divide or partition the plurality of received symbols into a first subset of received symbols and a second subset of received symbols. Examples of the steps involved in receiving the plurality of received symbols are described in further detail below with respect to, for example, FIGS. 4-8.

Translation instructions 266 may function to convert the plurality of received symbols into a plurality of display symbols. For example, when translation instructions 266 are executed by processor 270, translation instructions 266 may cause processor 270 of code device 120, and/or another processor to encode the plurality of received symbols into the plurality of display symbols. A first subset of received symbols are encoded into a first collection of multi-dimensional feature values and a second subset of received symbols are encoded into a second collection of multi-dimensional feature values. The first collection of multi-dimensional feature values may be a subset of properties of the plurality of display symbols. The second collection of multi-dimensional feature values may be a subset of properties of the plurality of display symbols.

Depending on how the first and second collections of multi-dimensional feature values are arranged, a number of different translation behaviors may be induced. For example, during encoding a first set of received symbols may be represented by varying values along one dimension of the set of multi-dimensional cyclic symbols, and a second set of received symbols may be represented by varying values along another dimension of the set of multi-dimensional cyclic symbols. In this example, information associated with the first and second subsets of received symbols may be represented (simultaneously) by the same display symbols. In another example, the first and second collections of feature values may be designed such that symbols translated from the first and second subsets of received symbols form non-intersecting sets, in which case individual multi-dimensional display symbols will correspond to either the first received subset, or the second received subset, but not both. For example, first and second collections of multi-dimensional feature values may include non-intersecting subsets of values associated with non-intersecting subsets of the plurality of display symbols.

As spatial and cyclic domain partitioning strategies become complex, the functionality of data-bearing symbols can be increased when associated with multiple cyclic properties. In one example, the first and second sets of collections may be modified with a mathematical model as the display symbols are repeated across space. In this example, cyclic shifts of different periodicities along different spatio-cyclic dimensions may increase the functionality of the symbols, especially in a constrained space for display. In another example, the first and second collections may be arranged to represent movement along different respective sets of directions in the multi-dimensional display symbol feature space. The simplest instance of this example is described above, i.e., where the directions are along individual dimensional axes of the feature value space. More sophisticated instances include cases where the directions associated with the collections may change as the display symbols are repeated over space, possibly determined in relation to a known shape or path. Examples of the steps involved in converting the symbols are described in further detail below with respect to, for example, FIGS. 4-8.

Referring to FIG. 3, code device 140 is illustrated to include a representation engine 362, a symbol engine 364, and a translation engine 366. In certain aspects, code device 120 may correspond to code device 120 of FIGS. 1-2. Code device 120 may be implemented in various ways. For example, code device 120 may be a computing system and/or any other suitable component or collection of components that represent data with multi-dimensional cyclic symbols.

Interface 280 may be any device that facilitates the transfer of information between code device 120 and external components. In some examples, interface 280 may include a network interface device that allows code device 120 to receive and send data to and from a network. For example, interface 280 may retrieve and process data related to representing data with multi-dimensional cyclic symbols from database 160.

Engines 362, 364, and 366 may be electronic circuitry for implementing functionality consistent with disclosed examples. For example, engines 362, 364, and 366 may represent combinations of hardware devices and instructions to implement functionality consistent with disclosed implementations. For example, the instructions for the engines may be processor-executable instructions stored on a non-transitory machine-readable storage medium and the hardware for the engines may include a processor to execute those instructions. In some examples, the functionality of engines 362, 364, and 366 may correspond to operations performed by code device 120 of FIGS. 1-2, such as operations performed when code instructions 260 are executed by processor 270. In FIG. 3, representation engine 362 may represent a combination of hardware and instructions that performs operations similar to those performed when processor 270 executes representation instructions 262. Similarly, symbol engine 364 may represent a combination of hardware and instructions that performs operations similar to those performed when processor 270 executes symbol instructions 264, and translation engine 366 may represent a combination of hardware and instructions that performs operations similar to those performed when processor 270 executes translation instructions 266.

Figure 4:
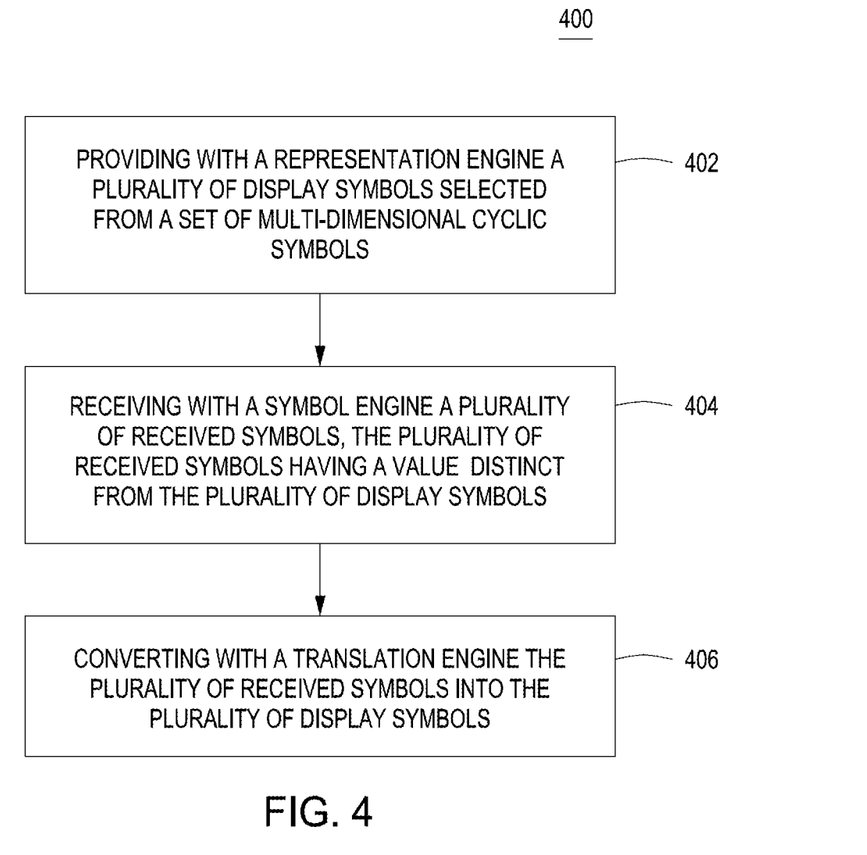
FIG. 4 illustrates a flow diagram of a method to represent data with multi-dimensional cyclic symbols according to an example.
Figure 5:
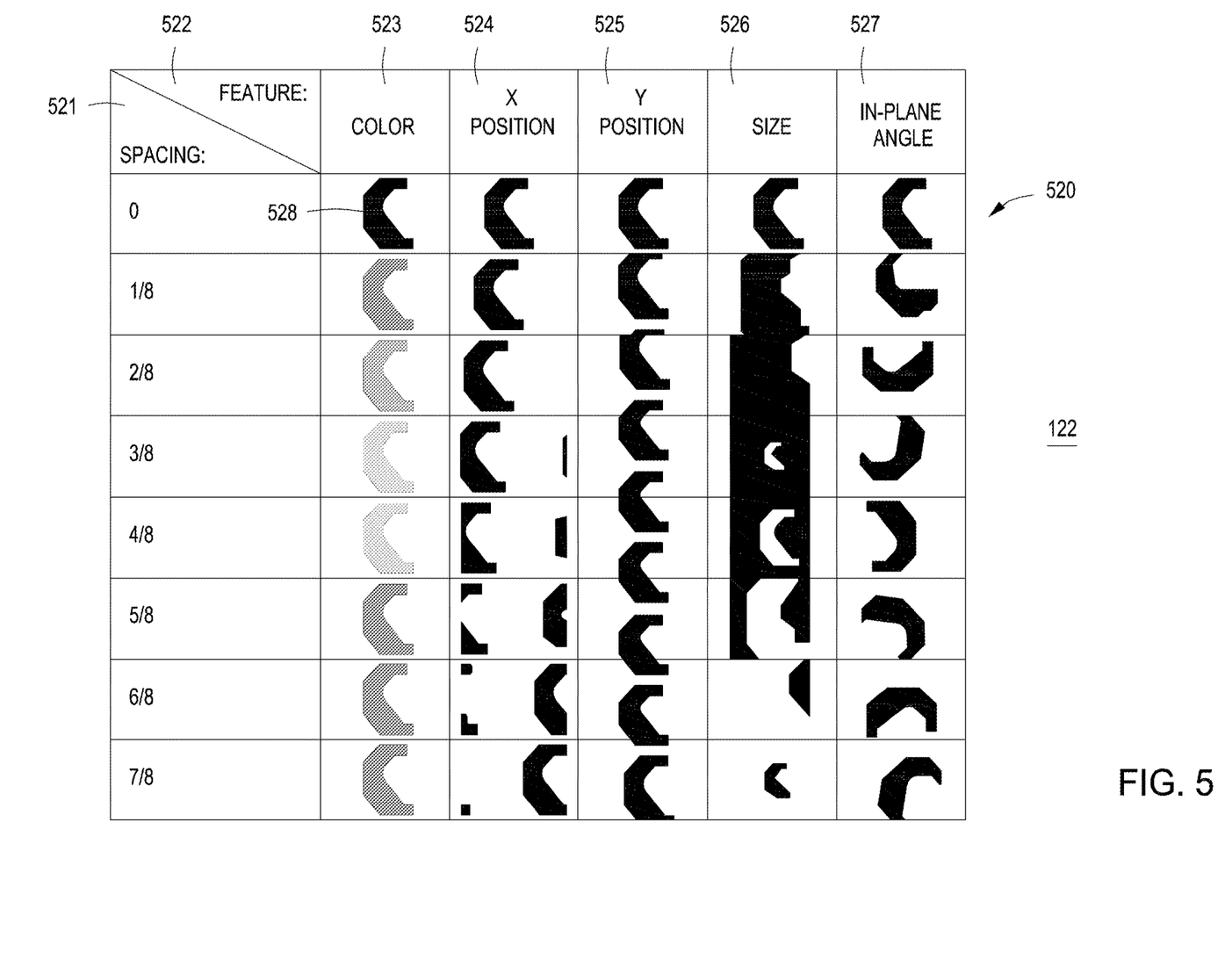
FIGS. 5-6 illustrate multi-dimensional cyclic symbols and an arrangement of symbols according to an example.

FIG. 4 illustrates a flow diagram of a method to represent data with multi-dimensional cyclic symbols according to an example. Although execution of process 400 is described below with reference to system 100, other suitable systems and/or devices for execution of at least one step of process 400 may be used. For example, processes described below as being performed by system 100 may be performed by code device 120, content device 140, and/or any other suitable device or system. Process 400 may be implemented in the form of executable instructions stored on a storage device, such as a machine-readable storage medium, and/or in the form of electronic circuitry.

Process 400 may start by providing with a representation engine a plurality of display symbols selected from a set of multi-dimensional cyclic symbols (step 402). For example, code device 120 may position a physical object, free to rotate around multiple dimensions, and capturing an image representing that object from a specific fixed viewpoint. As the image representing the object is rotated, the image captures the physical object cyclically with a differential phase between any two symbol values. For example, the image may be rotated along a latitude position out-of-plane or along a longitude position out-of-plane or in-plane. In order to increase the dimensionality of the display symbol set, an additional adjustment may be made to the physical attribute(s) of the object, such as the size or color may be varied.

The execution of the representation instructions 262 may also cause processor 270 of code device 120, and/or another processor to vary at least two features to generate the plurality of display symbols. The features and associated variations may be selected from a set of numbers, a set of colors, a set of sizes, a set of positions, a set of angles, and a set of glyphs. Two features, in accordance with an example, may include rotation of the symbol set and changing the color of the symbol set to form multi-dimensional cyclic symbols. To obtain the multi-dimensional cyclic symbols, the plurality of display symbols may be divided into a first collection of multi-dimensional cyclic symbols and a second collection of multi-dimensional cyclic symbols. The first collection of multi-dimensional cyclic symbols may include symbols in a first dimension, such as symbols in a variety of colors. The second subset of multi-dimensional cyclic symbols may include symbols in a second dimension, such as the symbol in the variety of colors at multiple positions, as illustrated in FIG. 5. FIG. 5 illustrates a non-symmetrical shape; however, other shapes or images may be used, such as an image of the world, simple shapes, and symmetrical objects. The multi-dimensional cyclic symbols may be stored in a storage device, such as database 160. Code device 120 or content device 140 of system 100 may access the multi-dimensional cyclic symbols from database 160 to define and provide the display symbols.

Process 400 may also include receiving with a symbol engine a plurality of received symbols (step 404). The plurality of received symbols may be distinct from the plurality of display symbols. For example, code device 120 and/or content device 140 may receive a binary code. The binary code may represent data or information to be encoded. The display symbols may be distinct, in an example, the display symbols may be shapes and the received symbols may be a binary code. The binary code and shapes may both be unique or different; however, in a further example, received symbols may be a binary code and display symbols may be numbers zero through seven. In the further example, the numbers one and zero are in both symbols or data sets; however, the symbol one and zero in the received symbols have different meanings than the one and zero in the display symbols even though, one and zero are used in both symbol sets. The binary code may be stored in a storage device, such as database 160, and code device 120 and/or content device 140 may query database 160 to obtain the binary code.

Process 400 may also include converting, with a translation engine, the plurality of received symbols into the plurality of display symbols (step 406). For example, code device 120 may encode the plurality of received symbols by encoding the information, such as a binary code, into the plurality of display symbols to enable the display symbols to be embedded in a target surface. An example of the display symbols include circular encodings that repeat symbols in the code words back to back across the target surface. Using circular coding complete payload recovery may be obtained with a view of a portion of the encoded surface.

One of the simplest encoding strategies that allows for recovery of the entire payload, with some degree of error checking, involves only three display symbols, such as (1) two color elements representing the data in the payload, and (2) a differently colored element to indicate auxiliary information required for decoding, such as, the starting position and/or length of the payload. The following practices and design choices help enable circular or cyclic decoding. First, the payload and the associated means to decode the payload tessellate the surface onto which display symbols are encoded. Display symbols are replicated in both the x- and y-directions for a two-dimensional planar surface. A portion of the display symbols are captured to recover the entire payload from a given x and y dimension, such as a rectangle, irrespective of the size or position of the rectangle captured. Display symbols may be continued wherein a number of possible perturbations in either the collections of feature values associated with possible display symbol subsets, or the resulting display symbols themselves are applied to each repetition. In one example, display symbols are assigned in semi-linear form, i.e., they may be continued over a plurality of rows, and perturbations may be applied on a per row basis. The relative locations of the individual symbols in a full set of symbols are reconfigurable. In one example, the starting points of the encoded symbols are unambiguously indicated using non-data symbols, such as start symbols, that are also part of the tessellated symbols. In another example, data symbols are encoded such that display symbols may be mapped back to received data symbols without the need to use non-data symbols for positional synchronization.

In some examples, code device 120 of system 100 may query database 160 to obtain display symbols. Code device 120 may then translate a first subset of the plurality of received symbols using a first collection of multi-dimensional feature values and translate a second subset of the plurality of received symbols using a second collection of multi-dimensional feature values. The second subset of the plurality of received symbols may be empty. In such a case, the empty subset may map to a display symbol that is designated at a starting or ending position, or may be omitted entirely, if the reason for omitting feature values is to improve robustness. In another example, the second collection of multi-dimensional feature values may include the plurality of display symbol feature values of the first collection of multi-dimensional feature values with a mathematical model applied to each value. This approach could be used, for instance, to vary some property of the displayed result across space. In yet another example, the mathematical model may be applied to the resulting display symbol values themselves, such as a collection of multi-dimensional feature values. The first and second subset of the plurality of received symbols and the first and second collections of multi-dimensional feature values may be stored in a storage device, such as database 160. After converting the plurality of received symbols has been completed, process 400 may end.

The process 400 may further include reading a pattern of display symbols and decoding the pattern of display symbols by translating the display symbols back to received symbols. The data may then be analyzed and information or values extracted therefrom.

Figure 6:
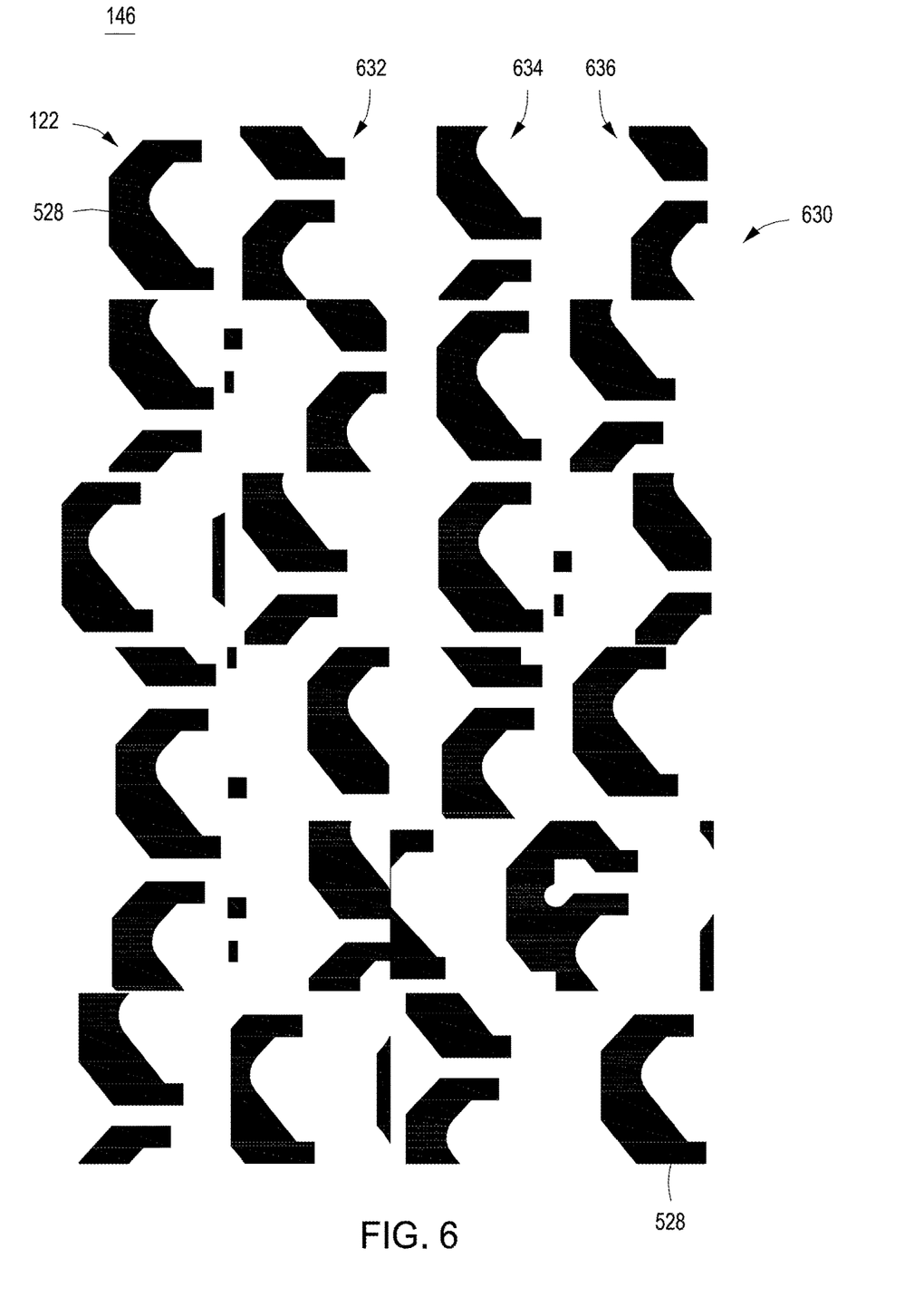

FIGS. 5-6 illustrate multi-dimensional cyclic symbols and an arrangement of symbols according to an example. Referring to FIG. 5 examples of display symbols 122 as a set of cyclic octalary (8-ary) symbols 520 are illustrated. The symbol sets may include a variety of spacings within each respective cyclic domain 521 and features 522. For example, the number of symbols in a given domain may vary across each cyclic domain. Referring to FIG. 5, in a further example, the number of symbols in a given domain may be identical across each cyclic domain.

In FIG. 5, features 522 illustrated are color 523, x-position 524, y-position 525, and size 526, and in-plane angle 527. Display symbols 122 are an irregular, non-symmetrical object 528 composed of evenly spaced parameter values in each respective cyclic space 521. One-eighth spacing is illustrated in FIG. 5; however, as is illustrated herein, additional spacing may be used to generate intermediate values. In other words, a continuous extension of the samples in each cyclic space 521 exists and may be used to alter the number of feature values used. A multi-dimensional cyclic symbol set may be formed by varying these parameters. Groups of received symbols 132 may be mapped to groups of multi-dimensional display symbols 122, such as those composed of y-position 525 and x-position 524 features 522, as illustrated in FIG. 6.

FIG. 6 illustrates an example of an encoded pattern 146 as a 4×6 symbol tile 630 encoding 1 bit/cell/cyclic dimension. The symbol set is composed of non-rational differences in the periodic x and y differential position 524, 525 spaces. For example, the first display symbol 122 in the rectangle is display symbol 122 in an initial position. Display symbols 122 may be perturbed by $\pm 1/(3\sqrt{3})$ in the periodic x position and by $\pm 1/(2\sqrt{2})$ in the periodic y position. For example, at symbol position 632, a combination of a $+1/(3\sqrt{3})$ periodic x position change and a $-1/(2\sqrt{2})$ periodic y position change has been applied; at symbol position 634, a combination of a $-1/(3\sqrt{3})$ periodic x position change and a $-1/(2\sqrt{2})$ periodic y position change has been applied; at symbol position 636, a combination of a $-1/(3\sqrt{3})$ periodic x position change and a $+1/(2\sqrt{2})$ periodic y position change has been applied; and so on. Display symbols 122 are illustrated as a 4×6 cell of tiles, but could also be represented in a single line of symbols or any variation of tiles or lines. The actual format of the display symbols 122 may accommodate the space it is displayed on.

FIG. 7-8 illustrate multi-dimensional cyclic symbols and an arrangement of symbols according to an example. FIG. 7 is an example of display symbols 122 as a set of a quinary (5-ary) symbols 740 composed of glyph and angle feature combinations. As illustrated in the example, received symbols 132 may be encoded in display symbols 122 as glyphs or letters A, B, C, D, and E that are positioned at a particular angle. Each letter and angle combination provide unique codes or links to data or information that may be encoded. FIG. 8 illustrates an example of encoded pattern 146 using the glyph and angle combinations.

A pattern of letters and angles 850 are illustrated in FIG. 8 to generate every third row, R3, R6 using cyclic symbols E and D that do not appear in the previous two rows R1, R2, R4, R5 to form the message "EDDED." The other rows include the letters A, B, and C, where there is a seven-periodic letter message "ABCBBAC" that repeats and shifts by two between each row. The pattern is a four-periodic angle region in rows R1, R2, R4, and R5. In other words, the letters are positioned at four different angles, for example, −45°, 0°, 45°, and 90°, and each group of letters at that angle includes three symbols or letters. The pattern also includes a two-periodic angle region in the vertical direction in columns C1, C2, C3, and C4.

As illustrated in FIGS. 5-8, multi-dimensional cyclic symbols may be used to encode information or messages with arbitrarily different vertical and horizontal periodicities along both cyclic dimensions. This approach may be thought of as a tile-based repetition code. Furthermore, depending on the specific periodicities involved the effective tile may be larger than an entire document, label, or surface where the encoding scheme is used. As a result, multi-dimensional cyclic data representations enable repetition coding schemes that obey many of the principles of circular coding, but are in fact more general.

Some well-known digital modulation techniques generate symbol spaces that are effectively cyclic or quasi-cyclic for the purpose of implementing convenient and near-capacity-achieving error correction encoding and decoding techniques. In general, traditional block codes may be used, but for some "turbo" decoding schemes to be effective, the candidate decoded symbols exist in a space with certain convenient properties. These properties may include the ability to estimate values along a continuum of possibilities. In a multi-dimensional cyclic data representation scheme, each individual cyclic dimension may be used for this purpose. As a result, multi-dimensional cyclic symbols generated may be more densely packed, than symbols generated with simpler one-dimension cyclic symbol sets, such as those symbols that might result from certain traditional modulation techniques. This functionality is very important for labeling applications where the available display area is highly constrained.

In one-dimensional M-ary symbol representation schemes, information may be differentially encoded with arbitrarily-spaced symbols in the cyclic domain. In a true multi-dimensional cyclic symbology, the optimizations that are possible grow by an order of magnitude, especially since there is no constraint on having a set of regularly spaced symbols in any cyclic dimension. This allows for maximum flexibility in designing robust data recovery schemes, as well as flexible methods for using special groups of symbols to convey different meanings, such as use of a piece of information from a different layer in an intended manner.

The overall density of information is shown to be $\log 2 (\pi k\ Mk)/2$ bits per module for a color barcode incarnation, where $Mk > 1$ is the number of allowable cyclic symbols along a given dimension. The functional maximum density in information packing is a function of both geometric and color properties. The number of colors used to represent the information, and the sizes of each module both come into play. For a module of a particular size, there is a minimum color difference that may be reliably detected when evaluating samples. In most cases, the optimal number is not likely to represent an integer partitioning of the space. The same principles involving non-integral partitions of cyclic domains applies here.

In a variety of applications related to packaging, labeling and document security, it is important to be able to identify and analyze content from various parts of a page and/or surface, even if those parts do not represent multi-dimensional cyclic data. Because multi-dimensional cyclic symbols are so compact, they enable much more flexible automated use of such a surface. A relatively small amount of multi-dimensional cyclic symbols may be used to provide the information needed to guide such an activity. It is important to have multiple layers of data present, since they allow for "self-calibrating" information extraction schemes, i.e., those that may monitor their own performance with quality measurements that are derived from properties that are orthogonal to those used to represent the data. In more traditional forms of error-correction coding and other mechanisms for promoting robust transmission of information, the presence of multiple layers of information may be used to facilitate more effective functional use of content on a given surface.

In some applications, specifically when multiple layers of information are needed for interpretation, one cyclic dimension may carry a compact, repeated message that may be decode from any appropriate cropped portion of the overall encoded message. Region-specific information may be represented by the other layer. One example would be a situation where multiple stages of decoding of data-bearing hard copied information may be performed at different times. Then, information from one layer may feed into interpretation of the next layer, even though the symbols used to generate both layers exist within the same space. FIG. 8 illustrates an example where a length-five message represented by a five-cyclic alphabet of glyphs is used to represent a repeat-coded message, and where position of glyphs are used to represent a completely different, higher density, message without any repetition coding.

The disclosed examples may include systems, devices, computer-readable storage media, and methods for representing data with multi-dimensional cyclic symbols. For purposes of explanation, certain examples are described with reference to the components illustrated in FIGS. 1-3. The functionality of the illustrated components may overlap and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-8 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this application and protected by the following claims.

What is claimed is:

1. A method comprising:
providing with a representation engine a plurality of multi-dimensional cyclic symbols, each of the multi-dimensional cyclic symbols having values of a first property and a second property, wherein the first property is cyclic in an M dimensional space, wherein the second property is cyclic in an N dimensional space, and wherein each of M and N is an integer greater than one;
receiving with a symbol engine a plurality of data values forming a first message and a second message, the plurality of data values being distinct from the values of the first and second properties for the plurality of multi-dimensional cyclic symbols;
converting with a translation engine the plurality of received symbols into a plurality of display symbols having a base greater than two selected from the plurality of multi-dimensional cyclic symbols, wherein the data values of the first message are encoded in the values of the first property for the plurality of display symbols, and wherein the data values of the second message are encoded in the values of the second property for the plurality of display symbols, wherein the data values of the first and second messages are distinct from the values of the first and second properties of the plurality of display symbols; and
presenting the plurality of display symbols via a target surface, wherein the values of the first property for the plurality of display symbols are decoded to obtain a decoded first message, and wherein the values of the second property for the plurality of display symbols are decoded using the decoded first message to obtain a decoded second message.

2. The method of claim 1, wherein decoding the values of the first property for the plurality of display symbols is performed using a cropped portion of the plurality of display symbols.

3. The method of claim 1, wherein the first property is an alphabet of glyphs, and wherein the second property is a position of the glyphs.

4. The method of claim 1, wherein presenting the plurality of display symbols comprises printing the plurality of display symbols on a physical media.

5. The method of claim 1, wherein presenting the plurality of display symbols comprises displaying the plurality of display symbols on a display device.

6. A non-transitory computer readable memory resource storing instructions that when executed by a computer processor to implement a system to represent data with multi-dimensional cyclic symbols, the instructions executable to:
provide a plurality of multi-dimensional cyclic symbols, the plurality of multi-dimensional cyclic symbols arranged cyclically with a differential phase between any two symbols, each of the multi-dimensional cyclic symbols having values of a first property and a second property, wherein the first property is cyclic in an M dimensional space, wherein the second property is cyclic in an N dimensional space, and wherein each of M and N is an integer greater than one;
receive a plurality of data values forming a first message and a second message, the plurality of data values being distinct from the values of the first and second properties for the plurality of multi-dimensional cyclic symbols;

convert the plurality of received symbols into a plurality of display symbols having a base greater than two selected from the plurality of multi-dimensional cyclic symbols, wherein the data values of the first message are encoded in the values of the first property for the plurality of display symbols, and wherein the data values of the second message are encoded in the values of the second property for the plurality of display symbols, wherein the data values of the first and second messages are distinct from the values of the first and second properties of the plurality of display symbols; and present the plurality of display symbols via a target surface, wherein the values of the first property for the plurality of display symbols are decoded to obtain a decoded first message, and wherein the values of the second property for the plurality of display symbols are decoded using the decoded first message to obtain a decoded second message.

7. The memory resource of claim 6, wherein the values of the first property for the plurality of display symbols are decoded using a cropped portion of the plurality of display symbols.

8. A system comprising:

a processor; and a storage medium storing instructions, the instructions executable by the processor to:

provide a plurality of multi-dimensional cyclic symbols, each of the multi-dimensional cyclic symbols having values of a first property and a second property, wherein the first property is cyclic in an M dimensional space, wherein the second property is cyclic in an N dimensional space, and wherein each of M and N is an integer greater than one;

receive a plurality of data values forming a first message and a second message, the plurality of data values being distinct from the values of the first and second properties for the plurality of multi-dimensional cyclic symbols;

convert the plurality of received symbols into a plurality of display symbols having a base greater than two selected from the plurality of multi-dimensional cyclic symbols, wherein the data values of the first message are encoded in the values of the first property for the plurality of display symbols, and wherein the data values of the second message are encoded in the values of the second property for the plurality of display symbols, wherein the data values of the first and second messages are distinct from the values of the first and second properties of the plurality of display symbols; and present the plurality of display symbols via a target surface, wherein the values of the first property for the plurality of display symbols are decoded to obtain a decoded first message, and wherein the values of the second property for the plurality of display symbols are decoded using the decoded first message to obtain a decoded second message.

9. The system of claim 8, wherein the values of the first property for the plurality of display symbols are decoded using a cropped portion of the plurality of display symbols.

10. The system of claim 8 wherein the first and second properties are selected from a display symbol color, a display symbol size, a display symbol angle of rotation, a display symbol horizontal position, and a display symbol vertical position.

11. The system of claim 8, wherein the instructions to present the plurality of display symbols comprises instructions to print the plurality of display symbols on a physical media.

12. The system of claim 8, wherein the instructions to present the plurality of display symbols comprises instructions to display the plurality of display symbols on a display device.

13. The system of claim 8, wherein the target surface is a printed package.

14. The method of claim 1, wherein the target surface is a printed package.

15. The memory resource of claim 6, wherein the target surface is a printed package.

16. The memory resource of claim 6, wherein the instructions to present the plurality of display symbols comprises instructions to print the plurality of display symbols on a physical media.

17. The memory resource of claim 6, wherein the instructions to present the plurality of display symbols comprises instructions to display the plurality of display symbols on a display device.

* * * * *